May 22, 1956 R. W. RICHARDSON ET AL 2,746,934
PROCESS FOR MAKING SPHERICAL SILICA-ALUMINA CATALYSTS
Filed June 18, 1952 2 Sheets-Sheet 1

Roger W. Richardson
Robert E. Schexnailder Jr. Inventors
By George J. Hiehey Attorney

United States Patent Office 2,746,934
Patented May 22, 1956

2,746,934

PROCESS FOR MAKING SPHERICAL SILICA-ALUMINA CATALYSTS

Roger W. Richardson, Baton Rouge, and Robert E. Schexnailder, Jr., Hope Villa, La., assignors to Esso Research and Engineering Company, a corporation of Delaware Application June 18, 1952, Serial No. 294,164

5 Claims. (Cl. 252—448)

This invention relates to an improved process for the manufacture of microspherical or microspheroidal catalyst particles and more particularly relates to the manufacture of silica-alumina catalysts in such form.

According to the present invention a solution of colloidal silica or silica hydrosol is mixed with anhydrous aluminum alcoholate in a solution of excess alcohol or in a hydrocarbon-alcohol mixture so that the water in the silica hydrosol will hydrolyze the aluminum alcoholate to form alumina which is formed in situ on or in the silica-containing particles. As the aluminum alcoholate hydrolyzes, the silica hydrosol sets to a gel because it becomes more concentrated as the water in the silica hydrosol reacts with the aluminum alcoholate or as the water is withdrawn from the silica hydrosol because of the partial miscibility of the water with the alcohol. To hasten the setting of the silica sol to the gel form, the temperature may be raised, the pH may be controlled, etc. The microspherical particles are then separated and dried in any suitable manner to produce catalyst.

Figure 1:
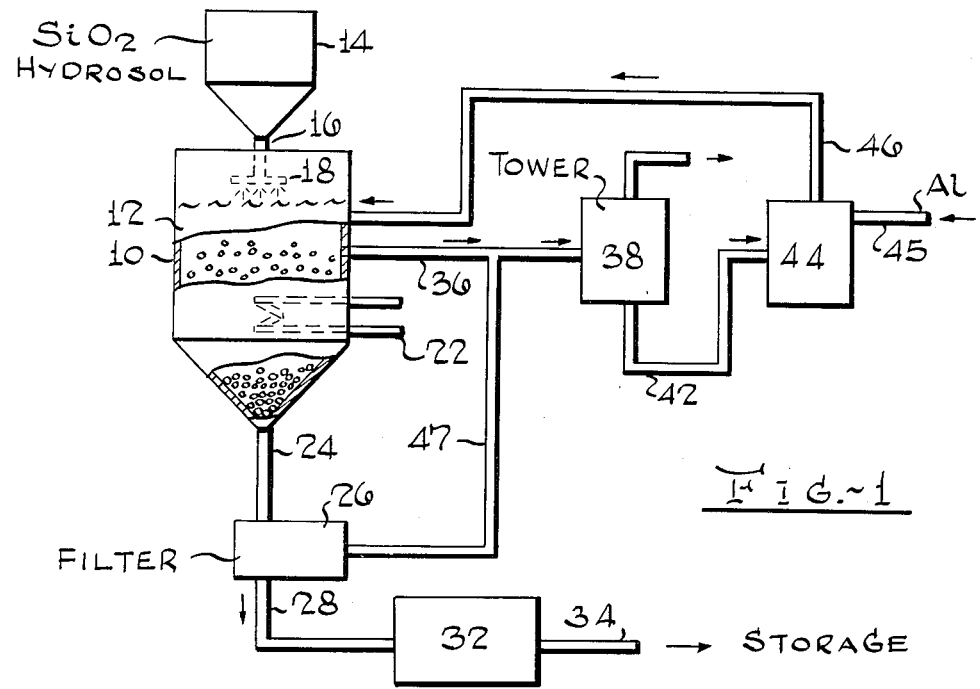
Fig. 1 represents one form of apparatus for making microspherical particles.

Referring now to Fig. 1 of the drawings, the reference character 10 designates a tank containing a solution of anhydrous aluminum alcoholate in an excess of alcohol or alcohol-hydrocarbon mixture 12. The alcoholate is dissolved in the alcohol-hydrocarbon mixture or if desired the hydrocarbon may be omitted so that the alcoholate is dissolved in an excess of only alcohol. The alcohols used in the manufacture of aluminum alcoholates may range from $C_1$ to $C_{10}$ or $C_{12}$ carbon atoms per molecule, but, in general, best results are obtained by using alcohols in the $C_4$ to $C_6$ range which have good partial miscibility with water, but successful catalysts may be made over a wide range of molecular weight alcohols. Partially water-miscible anhydrous alcohols such as n-butyl and amyl alcohols may be used alone. These alcohols tend to remove water from the droplets of silica sol and cause them to set more rapidly. With an excess of such alcohol, the gelation is hastened.

The silica hydrosol is conducted from tank 14 through line 16 into spray device 18 arranged above the alcoholate solution 12. Any form of spray device may be used to produce small particles or droplets of silica hydrosol which are passed down through the liquid 12. The silica hydrosol may be made by any desirable method but is preferably made by passing a dilute solution of sodium silicate through an acid regenerated cation exchange resin bed. Other cation exchange material may be used if desired.

The preparation of the silica hydrosol will now be described. The silica hydrosol used in the present process is a substantially pure silica hydrosol prepared by contacting a dilute solution of sodium silicate or other alkali metal silicate with an acid regenerable granular cation exchange material such as a cation exchange resin bed. The sodium silicate solution is diluted so that it contains not more than about 225 grams of silica per liter. Preferably the amount of silica should not be above about 50–150 grams per liter.

Suitable acid regenerable cation exchange materials which can be used are the well known organic cation exchange materials which are formed by sulfuric-acid treatment of coal, wood waste, petroleum sludge or lignite, or various synthetic resins of the polyhydric phenol formaldehyde type and phenol sulfonic acid-formaldehyde type which are well known in the art and need no further description. Examples of ion exchange resin material which may be purchased on the open market are designated Amberlite IR–100, IR–120 and IRC–50.

The substantially pure silica hydrosol has a concentration of silica of about 3% to 15% by weight. If desired, the silica hydrosol may be aged at about 150° F. to 210° F. for about 2 to 60 minutes so that its setting time is decreased and also the silica hydrosol is more highly polymerized before using it in the first step of the process.

The liquid bath 12 in tank or vessel 10 is heated to a temperature of about 100° F. to 210° F. by steam heating coil or other suitable heating means 22. The silica hydrosol particles as they contact the liquid bath 12 and pass down through it are surrounded by anhydrous aluminum alcoholate in the alcohol or in the alcohol-hydrocarbon solution. During the passage the water associated with the silica hydrosol will hydrolyze the aluminum alcoholate as it penetrates the droplets of silica sol to form alumina which is formed in situ on the silica-containing particles or droplets. During the hydrolysis the silica hydrosol sets to a silica hydrogel because the hydrosol becomes more concentrated as the water reacts with the aluminum alcoholate. In addition, some of the water is taken up by the excess alcohol to assist in water removal from the silica sol particles and hasten gelation. Also higher temperatures in the tank assist in causing the silica sol to set to a gel. If desired the pH of the silica sol can be adjusted to a range which causes rapid setting such as a pH range of 5 to 6.

The silica hydrogel particles impregnated with alumina settle to the bottom of tank 10 from which they are withdrawn through line 24 and passed to a filter 26 for removing excess alcohol or alcohol-hydrocarbon mixture, hydrogel particles being withdrawn through line 28 and passed to a drying device such as a tunnel or kiln drier 32 shown diagrammatically in the drawing, but other forms of drying means may be used. The dried silica alumina microspheres or microspheroidal particles are withdrawn from drier 32 through line 34 to storage. After drying, the silica alumina particles comprise a very active and superior catalyst. In general, the resulting catalyst should contain from about 5% to 40% by weight of alumina with the remainder being silica. The particles have a size between about 5 and 200 microns with most of the particles being between about 20 and 100 microns in diameter.

Spent alcohol or alcohol-hydrocarbon liquid is withdrawn from tank 10 through line 36 and heated to drive off water and the alcohol or alcohol hydrocarbon mixture is recovered in anhydrous form for further reaction with an additional amount of aluminum to make more aluminum alcoholate. The drying or dewatering tower for the spent alcohol-containing liquid is shown diagrammatically at 38 with the anhydrous alcohol-containing liquid being withdrawn through line 42 by means of which it is passed to vessel 44 where it is reacted with aluminum metal introduced via line 45.

Aluminum metal in the form of chips, turnings and the like are reacted with an anhydrous alcohol or alcohol mixtures or an alcohol-hydrocarbon solution, the hydrocarbon being heptane, octane or octane mixtures, or the like, or a hydrocarbon distillate boiling in the range of about 200° F. to 500° F. Preferably, mixtures of hydrocarbon and alcohol are used in 50 parts of each by volume, but the hydrocarbon may range from 0% to 90% of the total volume. The alcohol preferably used is Pentasol, a commercial mixture of isomeric amyl alcohols. A small amount of catalyst, such as mercuric chloride, is used. The mixture of alcohol-containing liquid and aluminum is heated to about 200° F. to 300° F., preferably about 250° F. The resulting aluminum alcoholate solution is then passed through line 46 and returned to tank 10. Filtrate containing alcohol from filter 26 is passed through line 47 and line 36 to recovery tower 38.

Figure 2:
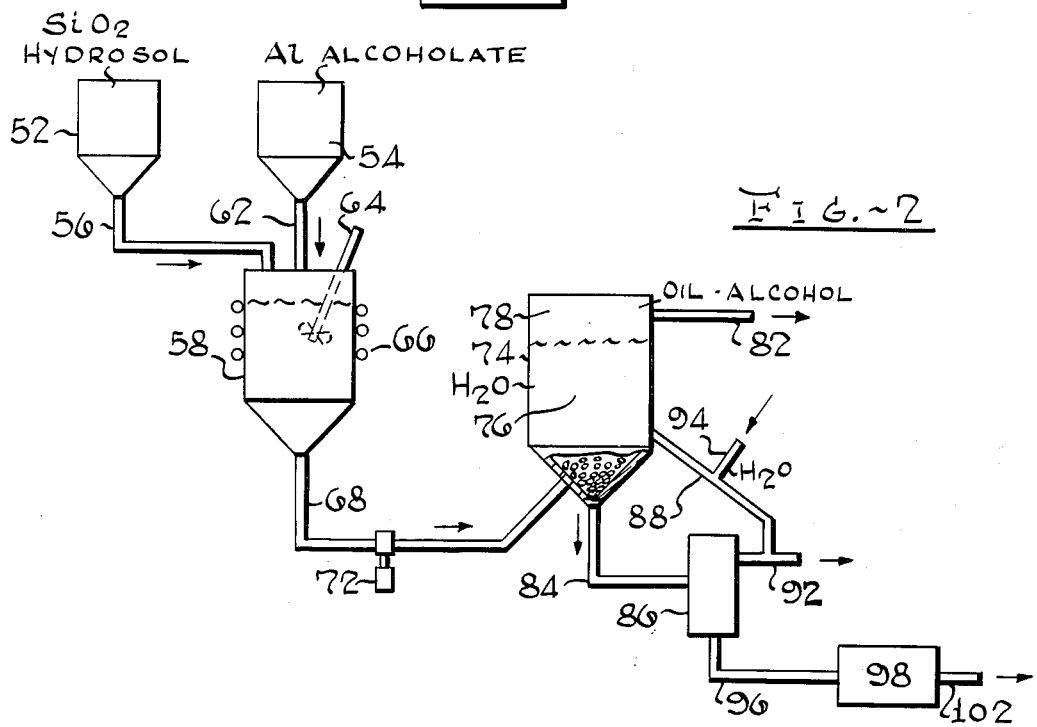
Fig. 2 represents another form of apparatus for making microspherical particles.

Referring now to Fig. 2, the reference character 52 designates a tank for holding silica hydrosol and reference character 54 designates a tank for holding anhydrous aluminum alcoholate dissolved in an excess of alcohol-containing liquid such as an alcohol or an alcohol-hydrocarbon mixture. Silica hydrosol from tank 52 passes through line 56 to mixing tank 58 and aluminum alcoholate solution passes from tank 54 through line 62 to mixing tank 58. The mixing tank is provided with a stirrer or agitator 64 to agitate the mixture of silica hydrosol and aluminum alcoholate solution and form microspherical or microspheroidal particles. An emulsion of hydrosol particles is formed in the alcohol-containing liquid mixture. Heating means 66 is provided for mixing tank 58 and may be steam, electric heating or any other suitable heating means. The mixing tank is maintained at a temperature of about 70° F. to 210° F. An emulsifier such as Alkaterge-O may be added to emulsification tank 58 if desired. Other conventional emulsifying agents, such as Aerosol, etc. may be used.

As the emulsion is formed in mixing tank 58, the aluminum alcoholate will essentially all be hydrolyzed to alumina which forms in situ on the silica hydrogel particles. As above pointed out in connection with the method of Fig. 1, the hydrolysis of the aluminum alcoholate will extract water from the silica hydrosol; this tends to concentrate the silica hydrosol and hastens the setting of the silica hydrosol to silica hydrogel. The excess partially water miscible alcohol also assists in water removal as above pointed out in the description of the process of Fig. 1. Heating of mixing tank 58 also hastens the gelation of the silica hydrosol.

The emulsion is passed from emulsifying tank 58 through line 68 by pump 72 and passed to settling tank 74 where gelling is completed and microspherical particles are recovered. Preferably, the emulsion is introduced into the bottom of settler 74 into a bottom water layer 76 so that the alcohol-containing solution passes up through the water layer 76 to the upper alcohol-containing layer 78. The hydrogel particles settle out or collect in the water layer. The spent alcohol containing liquid is withdrawn from layer 78 through line 82 and treated as above described in the method of Fig. 1 to recover the water insoluble alcohol or water insoluble alcohol-hydrocarbon mixture for reuse in making more aluminum alcoholate.

The silica-alumina hydrogel microspheres are withdrawn from the water layer 76 of settling tank 74 through line 84 to the filter 86 which separates the excess water from the solid particles, the water being recycled to the water layer 76 in tank 74 through line 88 or withdrawn from the process through line 92. Fresh make-up water may be added through line 94.

The filtered silica-alumina hydrogel microspheres are passed through line 96 to a drier 98 such as a tunnel or rotary drier, drum drier, spray drier or any suitable drying means. From the drier the particles are passed through line 102 to storage.

Silica hydrosol was prepared by contacting a dilute solution of sodium silicate with Amberlite IR-120 ion exchange resin. The silica hydrosol thus prepared contained about 5.07% $SiO_2$ by weight on a dry basis.

Aluminum alcoholate was prepared in a continuous reactor wherein; a 75% Pentasol (a mixture of amyl alcohols)—25% hydrocarbon, 240°-280° F. boiling range, mixture was contacted with aluminum metal using $HgCl_2$ as a catalyst. The alcoholate produced contained a quantity of aluminum equivalent to 50 grams $Al_2O_3$/liter.

Figure 3:
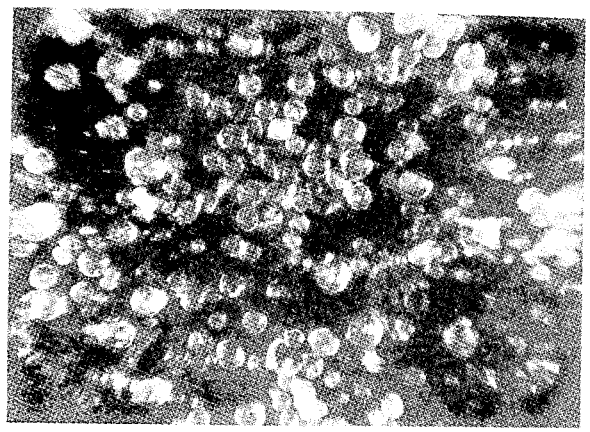
Fig. 3 represents a magnified picture of the microspherical particles produced according to this invention.

Silica alumina microspherical catalyst was prepared as follows:

To 2500 cc. of substantially anhydrous normal butanol at 130° F. containing 0.06 cc. Alkaterge-O per gallon as an emulsifier was added while stirring, 213 cc. of the silica hydrosol and immediately thereafter 37 cc. of the aluminum alcoholate. The hydrosol set rather quickly to a hydrogel and the butanol was decanted off. The silica alumina microspherical hydrogel particles were then dried at about 250° F. The resulting particles which contained about 85% silica and about 15% alumina by weight were essentially perfect microspheres of good shape and strength as may be seen by reference to the microphotograph reproduced as Fig. 3. The magnification in Fig. 3 is about fifty fold.

In the above example 250 cc. of reactants (213 cc. of silica hydrosol and 37 cc. of aluminum alcoholate solution) was added to 2500 cc. of normal butanol which served as a dispersing medium. Thus about 10 parts by volume of the dispersing medium were used to 1 part by volume of reactants. In commercial practice it would be preferable to use somewhat less of the dispersing phase which might be an alcohol such as butanol or a mixture of alcohol and a hydrocarbon. For example if an alcohol is used it is desirable to have a ratio of about 3 to 1 to about 10 to 1 of alcohol to the reactants. Preferably the alcohol is one having partial miscibility with water to assist in the withdrawal or removal of water from the silica sol during formation of the hydrogel.

The invention may also be utilized as a process for making alumina. The aluminum alcoholate is made as above described and is then added to an excess of normal butanol alcohol saturated with water. The water is present in sufficient quantity to react with the aluminum alcoholate and hydrolyzes it to alumina gel. By agitating the mixture in a way similar to that described above in connection with Fig. 2, the alumina hydrogel assumes the shape of substantially perfect spheres and the resulting product consists of microspheres of alumina gel. Or the process of Fig. 1 may be used.

The alumina gel so produced is an advantageous form for the preparation of hydroforming catalysts and may be impregnated with materials such as molybdic oxide, chromic oxide, nickel oxide, platinum, palladium or mixtures of these and other hydrogenating and hydroforming components.

What is claimed is:

1. A process for producing silica-alumina micro-spherical or microspheroidal catalyst which comprises forming droplets of silica hydrosol above a liquid body of anhydrous aluminum alcoholate in a solution containing excess alcohol, causing the silica hydrosol droplets to pass down through and contact said liquid body of anhydrous aluminum alcoholate to hydrolyze the alcoholate with the water in the silica hydrosol droplets and taking up water by the excess alcohol to hasten gelation of the silica hydrosol droplets and at the same time depositing alumina from the hydrolyzed aluminum alcoholate on the silica hydrogel droplets as they are forming, removing silica hydrogel droplets impregnated with alumina from the bottom of said liquid body of solution and drying the impregnated silica hydrogel droplets to form microspheroidal or microspherical silica-alumina catalyst.

2. A process according to claim 1 wherein the liquid body is maintained at a temperature between about 100° F. and 210° F.

3. A process according to claim 1 wherein the silica hydrosol is first aged at a temperature between about 150° and 210° F. for about 2 to 60 minutes before the formation of the silica hydrosol droplets.

4. A process for preparing microspheroidal silica alumina catalysts which comprises contacting substantially pure silica hydrosol in droplet form with a liquid body of solution of anhydrous aluminum alcoholate in an excess of a partially water miscible alcohol by causing the silica hydrosol droplets to fall through the body of the solution for contact therewith to hydrolyze the aluminum alcoholate by the water contained in the silica hydrosol droplets and at the same time depositing alumina formed by the hydrolysis on the silica hydrogel particles being formed, hastening the gelation of the silica hydrosol droplets by removing water from the silica hydrosol droplets by taking up water in the excess of partially water miscible alcoholate, removing silica hydrogel droplets impregnated with alumina from the bottom of said liquid body of solution and drying the impregnated silica hydrogel particles to form microspheroidal silica alumina catalyst.

5. A process according to claim 4 wherein the ratio of partially water miscible alcohol used to the amount of reactants including silica hydrosol and aluminum alcoholate solution is between about 3 to 1 to 10 to 1 by volume.

References Cited in the file of this patent

UNITED STATES PATENTS

| 2,317,803 | Reeves et al. | Apr. 27, 1943 |
| 2,636,865 | Kimberlin | Apr. 28, 1953 |